United States Patent [19]
Wilkie, II et al.

[11] Patent Number: 6,020,558
[45] Date of Patent: Feb. 1, 2000

[54] INSULATIVE BOOT FOR JOINTS BETWEEN POWER DISTRIBUTION CABLES AND FLAT CONDUCTORS

[75] Inventors: William Edward Wilkie, II, Fletcher; Reid Kimel Hartman, Hendersonville; Daniel Edward Hrncir, Jr., Fletcher, all of N.C.

[73] Assignee: Eaton Corporation, Cleveland, Ohio

[21] Appl. No.: 09/096,948

[22] Filed: Jun. 12, 1998

[51] Int. Cl.⁷ ...................................................... H02G 3/18
[52] U.S. Cl. ........................................................... 174/65 R
[58] Field of Search ............................... 174/65 R, 31 R, 174/71 R, 72 R

[56] References Cited

U.S. PATENT DOCUMENTS

| | | | |
|---|---|---|---|
| 1,949,197 | 2/1934 | Cornell, Jr. | 174/71 R X |
| 2,764,749 | 9/1956 | Aberle | 174/72 R X |
| 3,519,726 | 7/1970 | Ewing | 174/65 R X |
| 4,209,661 | 6/1980 | Pate et al. | 174/65 R |
| 4,229,616 | 10/1980 | Hotchkiss | 174/65 R X |
| 5,705,773 | 1/1998 | Smith | 174/75 B |

*Primary Examiner*—Dean A. Reichard
*Attorney, Agent, or Firm*—Martin J. Moran

[57] ABSTRACT

Electrical insulation and environmental protection for electrical joints between cables and flat conductors in an electric power distribution system is provided by a flexible, electrically insulative boot which has a pair of shell halves joined by a living hinge. The two shell halves have free edges which mate to form a seam when the shell is closed to form an enclosure around the joint. The flat conductor extends through the seam in the rear face of the shell adjacent the living hinge. Pairs of cable openings in the shell halves are spaced along the front face of the boot. Additional faces at each end of the front face also have pairs of cable openings to accommodate angled mounting of the cables. Slits extend from the free edges of the shell halves to the cable openings to allow installation over assembled joints. The cable openings are serrated to accommodate a range of cable sizes. The shell is secured closed by fasteners such as flexible ties which clamp flanges along the free edges of the shell halves together.

20 Claims, 4 Drawing Sheets

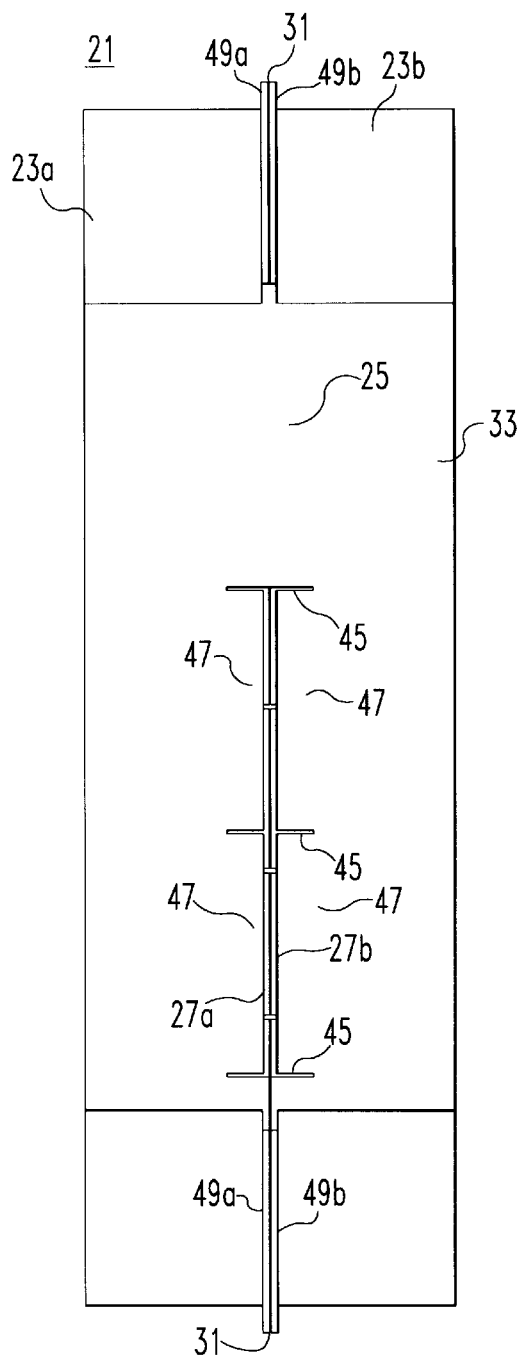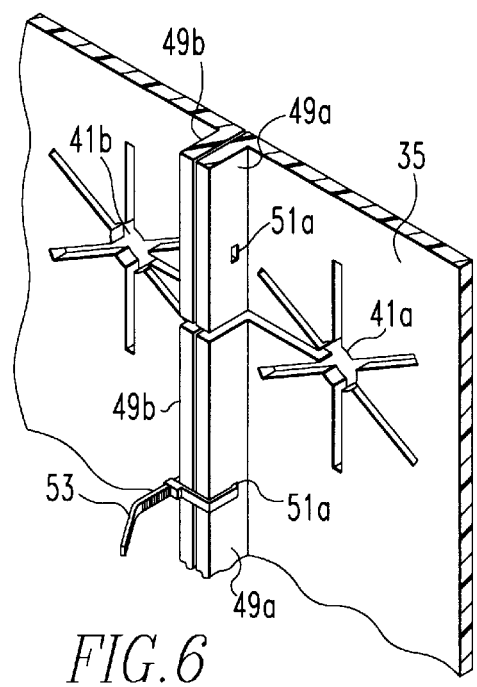

INSULATIVE BOOT FOR JOINTS BETWEEN POWER DISTRIBUTION CABLES AND FLAT CONDUCTORS

BACKGROUND OF THE INVENTION

1. Field of the Invention

This invention relates to insulation and protection for joints in electric power distribution systems, and in particular, to boots providing electrical insulation and environmental protection for the joints between electric cables and flat conductors connecting the cables to low voltage, high current switchgear.

2. Background Information

In many low voltage (conventionally below 600 volts rms) electric power distribution systems, cabling is used to connect the loads, such as motors, to protective switchgear, and often, to connect the switchgear to feeder buses over which the power is provided. Due to the large currents drawn by the loads, several cables are required for each phase. Typically, the cables are arranged in pairs with up to, for instance, ten pairs of cables required for 3,200 ampere service. Thus, for providing such service to a three-phase load, 30 pairs of cables are utilized.

The power switchgear used in these applications typically has heavy, flat copper line and load terminal conductors. It is common for the switchgear to have disconnects through which the switchgear is connected and disconnected with the source and load as it is inserted in or removed from an enclosure. A terminal adapter in the form of a flat conductor connects the cables to the disconnects. A joint is formed by securing the cables to the end of the flat conductor such as by compression or screw-type terminals. Typically, no covering or insulation is provided for these joints, although some users have the joints wrapped with electrical tape, a time consuming and minimally adequate procedure. Often such joints are provided for switchgear used in hostile environments such as a corrosive or particle laden atmosphere. Again, no protection from the hostile environment is offered, except that provided when the joints are wrapped with electrical tape.

There is a need, therefore, for improved protection for the joints between cabling and flat conductors in low voltage switchgear.

More particularly, there is an need for improved electrical insulation for such joints.

There is a further need for improved protection from hostile environments for such joints.

There is an important need for such improved protection for joints between cabling and flat conductors which is easy and economical to manufacture, install and remove.

SUMMARY OF THE INVENTION

These needs and others are satisfied by the invention which is directed to an insulating boot providing electrical insulation and protection from hostile environments for joints in electric power distribution systems between cables and flat conductors. The insulating boot comprises a flexible, electrically insulative shell having two confronting shell halves formed by a living hinge. The two shell halves have complementary free edges which abut to form a seam when the two shell halves are closed around the joint. At least one, but preferably both of the two shell halves have one or more slits extending inward from the free edge terminating in an opening through which an electrical cable may extend. Preferably, the slits terminating in the openings are provided in opposed pairs in the two shell halves. Also preferably, the openings are serrated to accommodate a range of sizes of the cables. The flat electrical conductor penetrates the flexible, electrically conductive shell, preferably, through the seam, and most preferably, adjacent the living hinge. Slots extending inward from the free edges of the two shell halves form confronting flaps which accommodate for the thickness of the flat conductor.

In order to provide flexibility for the cabling connections, the flexible, electrically conductive shell has a rear face incorporating the living hinge and a front face opposite the rear face in which the cable openings are provided. An additional face adjacent one end, and preferably additional faces adjacent both ends of the front face, also have cable openings. These additional faces make an included angle with the front face which is preferably less than about 90°, and preferably these angles are equal.

In use, the flexible, electrically insulative shell is opened by bending the two shell halves back about the living hinge and then slipped over the flat conductor which extends through the flaps adjacent the living hinge. The shell is closed with the cables passing through the slits and into the cable openings. The shell is held closed and retained in place over the joint by closure means which includes flanges extending outward along at least portions of the free edges of the two shell halves and at least along the front face in the two additional faces. The flanges are secured in abutting relationship by fastener means which preferably includes aligned openings in the flanges and fasteners extending through these aligned openings. Preferably, the fasteners are in the form of flexible ties.

BRIEF DESCRIPTION OF THE DRAWINGS

A full understanding of the invention can be gained from the following description of the preferred embodiments when read in conjunction with the accompanying drawings in which:

FIG. 5 is a rear view of the insulative boot of FIGS. 3 and 4.

FIG. 6 is a fragmentary isometric view in enlarged scale illustrating how halves of the insulative boot secure together in accordance with the invention.

DESCRIPTION OF THE PREFERRED EMBODIMENTS

Figure 1:
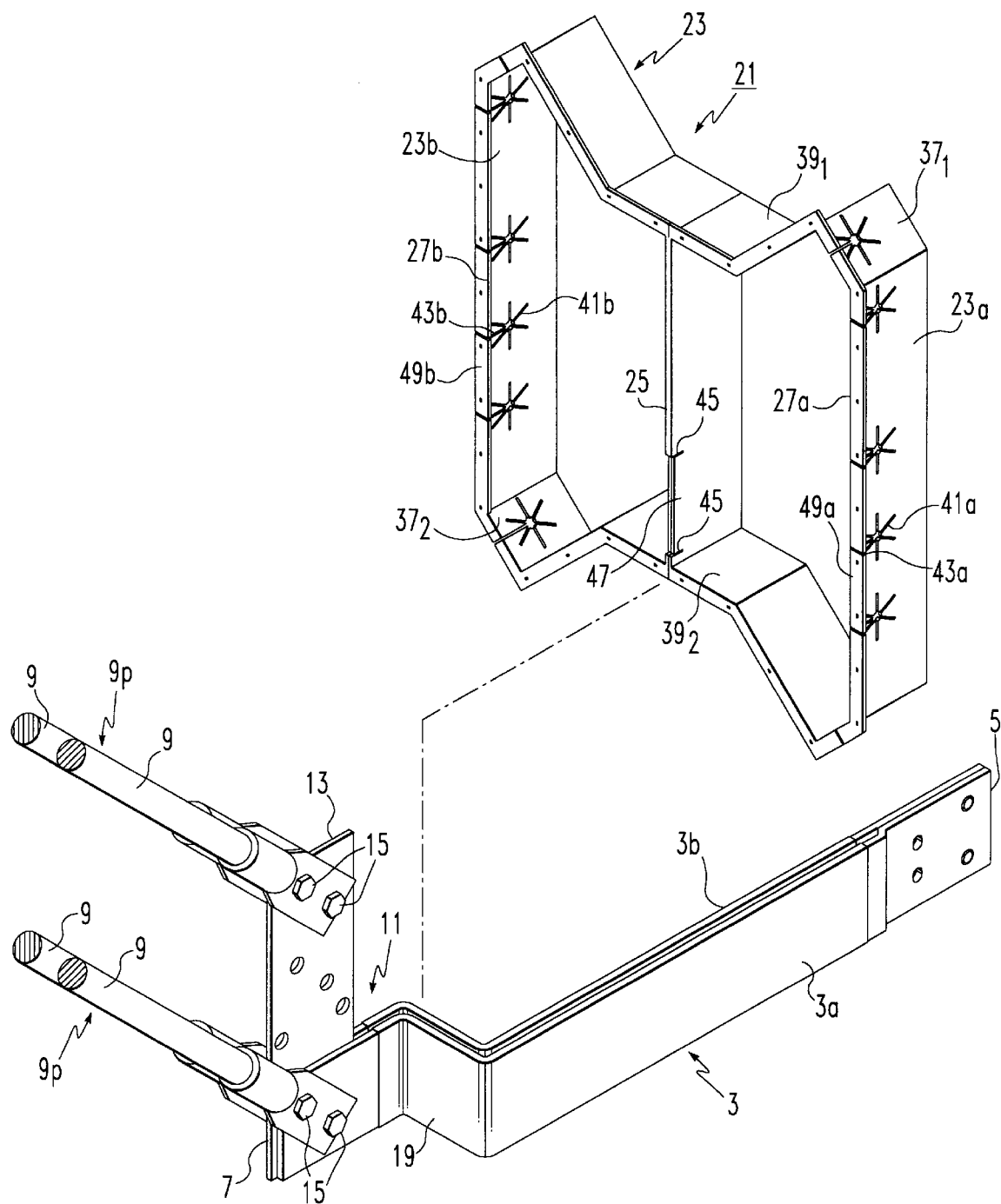
FIG. 1 is an isometric view of an insulating boot in accordance with one embodiment of the invention shown rotated open for installation on a cable/flat conductor joint in an electric power distribution system.

Referring to FIG. 1, the electric power system 1 includes a flat conductor 3 which, in the form shown, is a terminal adapter for switchgear (not shown). The particular flat conductor 3 includes two conductor members 3a and 3b. The ends of the flat member 3a are offset so that while the members 3a and 3b abut at the ends, they are spaced apart throughout most of their length. One end 5 of the flat conductor is adapted to be connected to a disconnect (now shown). The other end 7 of the flat conductor is connected to electrical cables 9 to form an electrical joint 11. As mentioned previously, several cables are required to carry the current. Thus, the joint end 7 of the flat conductor 3 has an extension 13 to accommodate the required cables. Furthermore, the cables are typically mounted in pairs 9p on either side of the flat conductor 3 as extended by the extension 13. Depending upon the physical arrangement of the distribution system, it is sometimes desirable to have the cables mounted at an angle to the longitudinal axis of the flat conductor 3 as shown in FIG. 1. Typically, the cables 9 are secured to the flat conductor 3 with compression or mechanical screw-type terminals 15. As shown in FIG. 1, the cables 9 are provided with insulation up to their terminal portions. Likewise, the flat conductor is covered with insulation 19 between its ends. Typically, the electrical joints 7 are not insulated. This presents a hazard to personnel who may be required to service the switchgear. As also mentioned, these types of electrical joints 11 are often used in hostile environments where they are exposed to a corrosive or particle laden atmosphere.

In accordance with the invention, an insulative boot 21 provides electrical insulation and environmental protection for the electrical joint 11. This insulative boot 21 is a flexible, electrical insulative shell 23 which may be molded of a flexible material with excellent dielectric characteristics, such as a plastisol, as for example, polyvinyl chloride, or other suitable flexible, insulative materials. The shell 23 is made of two shell halves 23a and 23b joined by an integral living hinge 25. The shell halves 23a and 23b have confronting complementary free edges 29a and 29b which extend around the periphery of the shell half except for the area of the living hinge 25. When the shell 23 is bent about the living hinge 25 the confronting shell halves close along their complementary free edges 29a and 29b to form an enclosure 29 with a seam 31 (see FIG. 2).

The shell 23 has a rear face 33 incorporating the living hinge 25. A front face 35 is opposed to and is preferably generally parallel to the rear face 33. First and second additional faces $37_1$ and $37_2$ extend from opposite ends of the front face 35 at included angles $\alpha_1$ and $\alpha_2$ which are less than 90°, preferably about 40 to 50 degrees, but in any event, selected to accommodate the angles at which the cables 9 are mounted to the joint 11. In the exemplary embodiment these angles $\alpha_1$ and $\alpha_2$ are each about 50° (see FIG. 4). End walls $39_1$ and $39_2$ extend from the rear face 33 toward the front face 35 and then flare outward to the additional faces $37_1$ and $37_2$. This configuration allows for leading the cables 9 out from the joint 11 at angles to the longitudinal axis of the flat member as discussed above.

Cable openings 41 are provided in the front face 35 and the additional faces $37_1$ and $37_2$. These cable openings are arranged in aligned pairs 41p in the two shell halves 23a and 23b. Slits 43a and 43b extend from the complementary free edges 27a and 27b of the shell halves to the cable openings 41a and 41b. These slits 43a and 43b allow the boot to be placed over the cables after they are secured to the flat conductor 3. Preferably, the cable openings 41a and 41b are serrated to accommodate a range of cable sizes.

The flat conductor 3 penetrates the shell 23 through the rear face 33. Preferably, this penetration is through the seam 31, although a separate slot in the middle of the living hinge 25 could be provided alternatively. This latter configuration would require that the boot be slipped onto the flat conductor either before the cables are installed or before the end 5 is connected to the disconnect.

In order to accommodate for the thickness of the flat conductor 3, slots 45 extending from the free edges 27a and 27b form flaps 47. This also accommodates for various thicknesses of the flat conductor 3. Confronting closure flanges 49 extend outward from the free edges 27 of the two shell halves 23a and 23b and extend around the end faces 39, the additional faces 37 and the front face 35. Various fastening devices can be used to clamp the flanges in abutting relationship to hold the shell halves 23a and 23b closed against each other. In the preferred embodiment of the invention, aligned apertures 51 are spaced along the flanges 49 as shown in FIG. 6. Various types of fasteners can be inserted through these apertures 51a and 51b. In the exemplary embodiment of the invention, flexible ties 53 such as nylon ties are inserted through the apertures 51.

Figure 2:
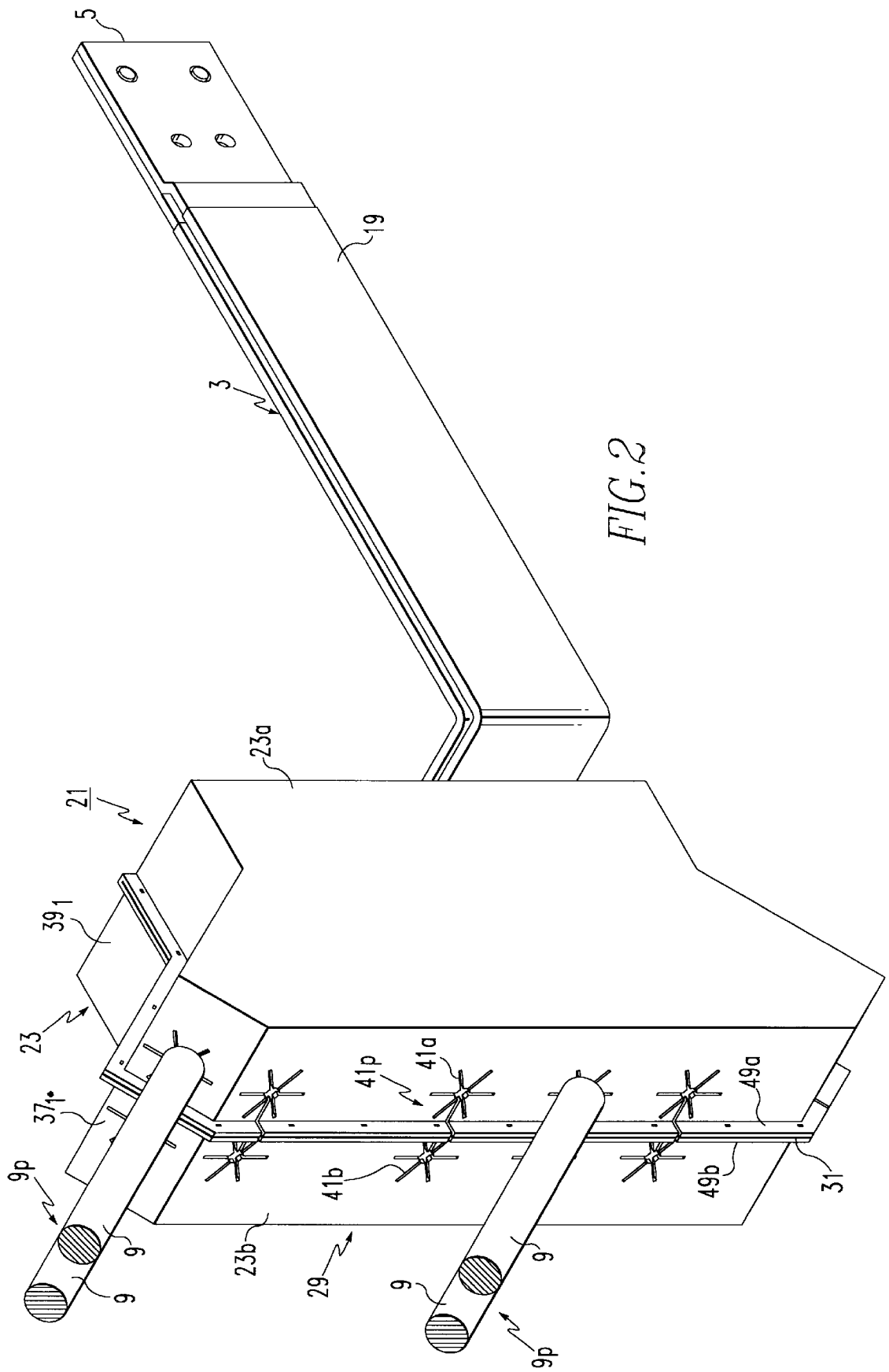
FIG. 2 is an isometric view of the insulative boot of FIG. 1 shown secured in place over the joint.
Figure 3:
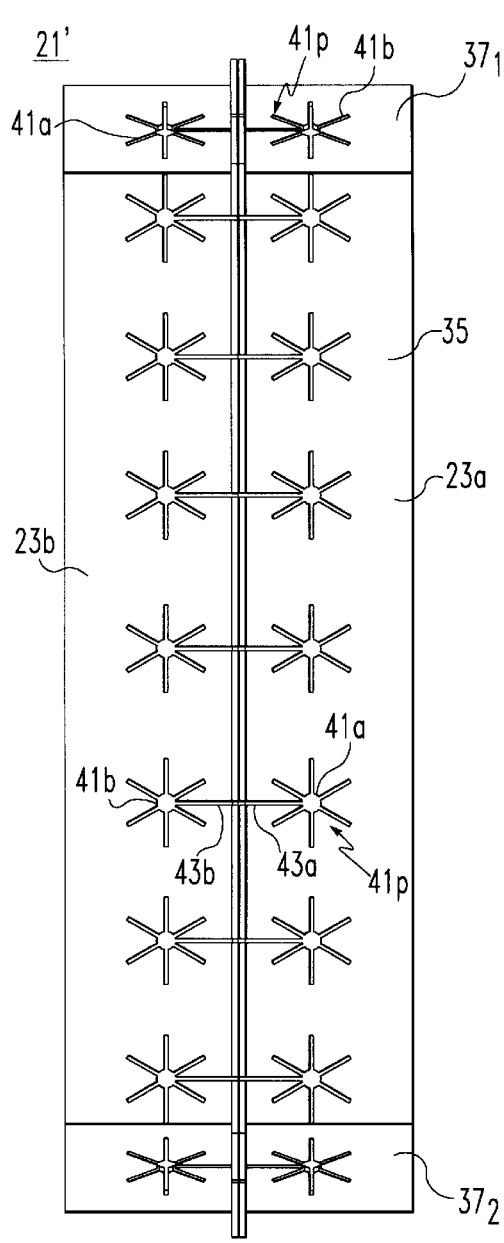
FIG. 3 is a front view of an insulative boot in accordance with another embodiment of the invention.
Figure 4:
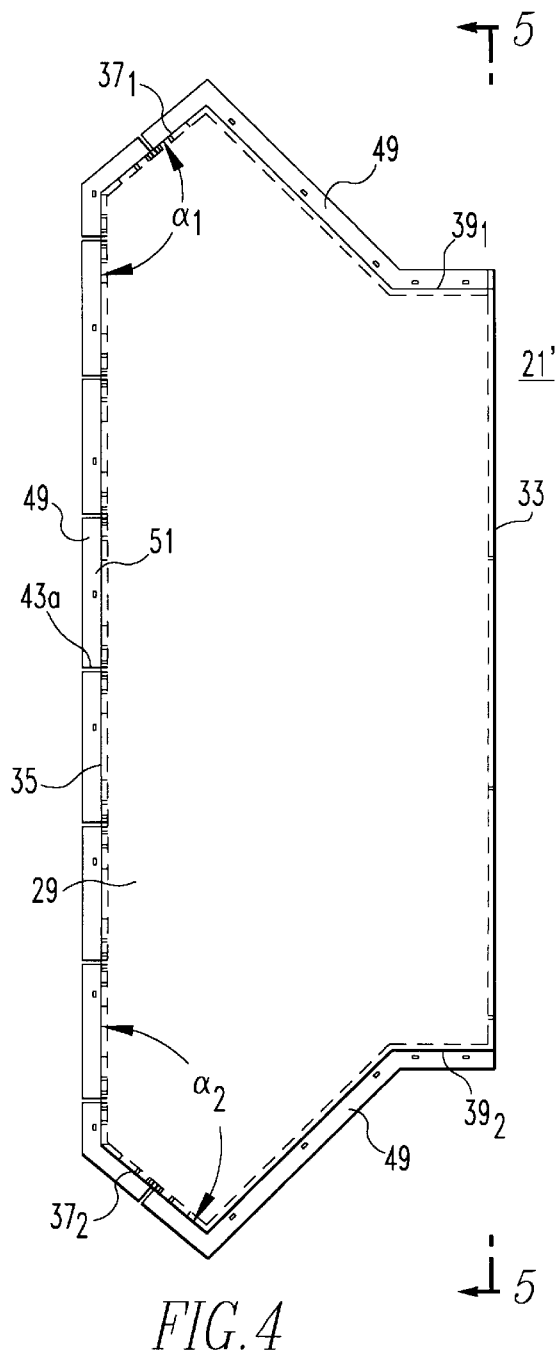
FIG. 4 is a side view of the insulative boot of FIG. 3.

In use, the required number of cables 9 are fixed to the flat conductor 3 at the desired lead angles. The two shell halves 23a and 23b are grasped and rotated apart about the living hinge 25 as shown in FIG. 1. The shell 23 is then brought downward so that the flat conductor 3 enters the open seam 31. The two halves of the shell 23a, 23b are then rotated toward each other with the cables being led through the appropriate slits 43a and 43b into the cable openings 41a and 41b. At this point, the flanges 49a and 49b abut each other and can be secured by nylon ties 53. FIG. 2 illustrates the boot 21 in place over an electrical joint providing electrical insulation and environmental protection for the joint. FIGS. 3–5 illustrate another embodiment of the invention which would be suitable for 3,200 amp service. As such, the boot 21' is larger and has additional pairs $41_p$ of cable openings. The exemplary boot 21' as will be noticed has nine pairs of cable openings $41_p$. As in the case of all of the sizes of the insulative boots, additional pairs of cable openings $41_p$ are provided for flexibility in the arrangement of the cables. As mentioned previously, it is typical to have ten pairs of cables for 3,200 amp service. Thus, all of the pairs of openings 41p are not utilized in a particular installation, but different combinations can be used to accommodate the particular installation.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An insulating boot for a joint in a low voltage electric power system between a flat conductor and at least one electrical cable connected to an end of said flat conductor, said boot comprising:

a flexible, electrically insulative shell having two confronting shell halves joined by a living hinge to form an enclosure surrounding said joint, said shell halves having complementary free edges which abut to form a seam with said shell halves closed around said joint, said flat conductor extending through said electrically insulative shell and at least one of said shell halves having at least one slit extending from said free edge inward and terminating in a cable opening through which said at least one cable extends with said shell halves closed, and closure means securing said confronting shell halves with their complementary edges abutting to form said seam.

2. The insulating boot of claim 1 wherein said cable opening is serrated to accommodate a range of cable sizes.

3. The insulating boot of claim 1 wherein said at least one shell half has a plurality of slits spaced along said free edge and each terminating in a cable opening.

4. The insulating boot of claim 3 wherein said cable openings are serrated to accommodate a range of cable sizes.

5. The insulating boot of claim 1 wherein said two confronting shell halves have an aligned pair of slits extending inward from said free edges and terminating in cable openings.

6. The insulating boot of claim 5 wherein said two confronting shell halves have multiple pairs of opposed slits spaced along said free edges and terminating in cable openings.

7. The insulating boot of claim 6 wherein said closure means comprises flanges extending outward along at least a portion of said complementary free edges of said two confronting shell halves and fastener means securing said flanges in abutting relationship.

8. The insulating boot of claim 6 wherein said cable openings are serrated to accommodate a range of cable sizes.

9. The insulating boot of claim 8 wherein said flexible, electrically insulative shell has a rear face incorporating said living hinge, a front face opposite said rear face and at least one additional face extending from the front face at an included angle of less than about 90°.

10. The insulating boot of claim 9 wherein said front face is substantially parallel to said rear face, and wherein said at least one additional face of said flexible, electrically insulative shell comprises first and second additional faces extending from opposite ends of said front face at first and second included angles both of which are less than about 90°.

11. The insulating boot of claim 10 wherein said first and second included angles are about equal.

12. The insulating boot of claim 10 wherein said closure means comprises flanges extending outward along said complementary free edges of said two shell halves on said front face and said first and second additional faces, and fastener means securing said flanges in abutting relationship.

13. The insulating boot of claim 12 wherein said fastener means comprises apertures through said flanges and flexible ties extending through said apertures.

14. The insulating boot of claim 9 wherein said flat conductor extends through said seam on said rear face adjacent said living hinge.

15. The insulating boot of claim 14 wherein slots extend inward from said complementary free edges of said two confronting shell halves to form flaps which deflect to accommodate penetration of said flat conductor into said flexible, electrically insulative shell.

16. The insulating boot of claim 1 wherein said closure means comprises flanges extending outward along at least portions of said complementary free edges of said two shell halves, and fastener means securing said flanges in abutting relationship.

17. The insulating boot of claim 16 wherein said fastener means comprises aligned apertures in said flanges and ties extending through said aligned apertures.

18. The insulating boot of claim 1 wherein said flat conductor extends through said seam formed by said complementary free edges of said two shell halves.

19. The insulating boot of claim 18 wherein said flat conductor extends through said seam adjacent said living hinge.

20. The insulating boot of claim 18 wherein slots extend inward from said complementary free edges of said two shell halves to form flaps which deflect to accommodate penetration of said flexible, electrically insulative shell by said flat conductor.

* * * * *